United States Patent [19]

Guill

[11] Patent Number: 5,362,098
[45] Date of Patent: Nov. 8, 1994

[54] RELEASABLE UNCONSTRAINED INFLATABLE BODY PROTECTOR

[75] Inventor: Frederick C. Guill, Crownsville, Md.

[73] Assignee: The United States of America as represented by the Secretary of the Navy, Washington, D.C.

[21] Appl. No.: 104,682

[22] Filed: Aug. 11, 1993

[51] Int. Cl.⁵ .............................................. B60R 21/18
[52] U.S. Cl. .................................. 280/733; 280/734; 280/735; 244/122 AG
[58] Field of Search ............... 280/733, 734, 735, 730, 280/728 R; 244/122 AG; 340/945, 961, 532, 665–669

[56] References Cited

U.S. PATENT DOCUMENTS

| | | | |
|---|---|---|---|
| 3,897,081 | 7/1975 | Lewis | 280/150 |
| 3,905,615 | 9/1975 | Schulman | 280/150 |
| 3,930,667 | 1/1976 | Osuchowski et al. | 280/150 |
| 4,059,852 | 11/1977 | Crane | 2/2 |
| 4,346,914 | 8/1982 | Livers et al. | 280/735 |
| 4,348,037 | 9/1982 | Law et al. | 280/733 |
| 4,424,509 | 1/1984 | Andres et al. | 340/52 |
| 4,437,628 | 3/1984 | Schwartz | 244/122 |
| 4,842,301 | 6/1989 | Feldmaier | 280/735 |
| 4,971,354 | 11/1990 | Kim | 280/733 |
| 4,979,763 | 12/1990 | Blackburn | 280/735 |
| 4,984,821 | 1/1991 | Kim et al. | 280/728 |
| 4,995,639 | 2/1991 | Breed | 280/735 |
| 5,069,478 | 12/1991 | Kim | 280/733 |
| 5,073,860 | 12/1991 | Blackburn et al. | 364/424.05 |
| 5,091,992 | 3/1992 | Pusic | 2/2 |
| 5,109,341 | 4/1992 | Blackburn et al. | 364/424.05 |
| 5,118,134 | 6/1992 | Matters et al. | 280/735 |

FOREIGN PATENT DOCUMENTS 1524022 9/1978 United Kingdom ............ 280/730 R Primary Examiner—Kenneth R. Rice
Assistant Examiner—Christopher P. Ellis
Attorney, Agent, or Firm—Paul I. Kravetz; Harry E. Barlow; John L. Forrest, Jr.

[57] ABSTRACT

A device for providing crash protection to people aboard a land, air, sea or space vehicle. A crash sensor mounted on the vehicle is used to sense a crash, impact or jarring motion. Data from the crash sensor is then transmitted via wireless communication by a signal transmitter to a signal receiver mounted on a harness worn by a crew member or passenger. When a crash signal is received, inflation mechanisms inflate inflatable bladders mounted on the harness, thereby protecting the person wearing the harness.

20 Claims, 3 Drawing Sheets

RELEASABLE UNCONSTRAINED INFLATABLE BODY PROTECTOR

BACKGROUND OF THE INVENTION

1. Field of the Invention

The present invention relates to crash protection systems, and more particularly, to crash protection systems employing inflatable bladders (commonly referred to as "airbags").

2. Description of the Related Art

Crew members and passengers aboard an aircraft may be required to walk around the cabin of an aircraft during flight, however, during this time they do not have adequate protection from bodily injury in case of crash or unnatural jarring motion. These crew members and passengers are "unrestrained," that is, they are not secured in place or strapped in a seat. For example, a crew chief aboard a military helicopter may be required to move about a helicopter cabin during periods of particularly high risk of crash such as when performing an "eyes and ears" function (i.e., advising a pilot or copilot of the helicopter's location relative to obstructions and other hazards).

Under some circumstances, a crew chief can rely upon minimal restraints, such as a gunner's belt, but even these type of minimal restraints interfere with a crew chief's duties and cannot be employed in all situations. As a consequence, crew chiefs are often totally unrestrained or unsupported during mishaps and, therefore, crew chiefs suffer severe or even fatal injuries disproportionate to their representation among helicopter crew members.

Other military helicopter crew members, such as mine sweep operators, must be positioned in locations which cannot be equipped with normal crew protective systems such as energy absorbing seats and full torso restraint systems. These crew members may be in extremely close proximity to a multitude of potential strike hazards. The nature of their duties requires that these personnel operate from more hazardous positions with the attendant increased risk of injury should a crash occur.

Current methods of protection for military helicopter crew members include a gunner's belt or, worse, no restraint at all. A gunner's belt fails to restrain the wearer's body. It is primarily intended to prevent the wearer from falling from an in-flight helicopter. With a gunner's belt, a wearer is at the end of a long webbing pendant and, in the event of a crash, will be flung about freely to strike any hazard which might be within the radius described by the pendant and the flexed human body at its end. In addition, if a crew member took a gunner's belt with him to connect at various points in the helicopter as he moved about, the gunner's belt would be an encumbrance and pose a potential entanglement hazard, capable of snagging upon cargo, equipment, structure, other personnel, etc.

Another option is to require military crew members to remain seated and fully restrained. This is a totally unacceptable alternative from a safety of flight operations viewpoint since a crew member would be unable to perform a valuable "eyes and ears" function.

"Airbag" systems have been used to protect persons on moving vehicles such as automobiles, however, these systems are designed to protect people in restrained positions. For example, the driver of an automobile is restrained in the driver's seat. Automobile-type airbag systems are not designed to protect an unrestrained person, such as those who must walk throughout the cabin of a moving helicopter.

SUMMARY OF THE INVENTION

Accordingly, one object of the present invention is to provide a crash protection system for protecting crew members or passengers of land, air, sea or space vehicles who must move about the vehicle while it is moving.

A further object of the present invention is to provide a crash protection system for protecting people on vehicles who are located in positions which cannot be equipped with normal crash protection systems and/or are located in physical positions in close proximity to strike hazards.

An additional object of the present invention is to provide a crash protection system which allows people on vehicles to walk around the vehicle in an unconstrained manner.

A still further object of the present invention is to provide unrestrained people aboard moving vehicles protection against injury due to crash acceleration forces and impacts against vehicle structure, equipment, and other objects resulting from being thrown about the cabin of the vehicle during crash impact and also to make these unrestrained people less of a hazard to others occupying the cabin by spreading the impact force to a larger area of contact and not the limited hard area of a flying body.

An even further object of the present invention is to provide protection to unrestrained people aboard moving vehicles while allowing these people to perform their functions without encumbrances or entanglements with cargo, equipment, structure or other personnel.

An advantage of the present invention is to utilize inflatable bladder (or "airbag") technology and crash sensing technology.

A further advantage of the present invention is to utilize wireless communication to activate an inflatable bladder inflation mechanism.

A feature of the present invention is to utilize an inflatable protection outfit which can be worn by a person yet provide minimal encumbrances to the wearer.

These and other objects, advantages and features are realized in the present invention which provides an inflatable protective device for protecting an unrestrained person aboard a land, air, sea or space vehicle. The invention utilizes an inflatable device, such as an inflatable body protection outfit, for providing impact protection. An inflation mechanism is coupled to the inflatable device. A crash sensor, mounted to the vehicle, is used for detecting the onset of a crash. The crash sensor is linked to the inflation mechanism by a wireless communication system. Upon sensing the onset of a crash by the crash sensor, a wireless communication signal is transmitted which causes the inflation mechanism to inflate the inflatable device.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
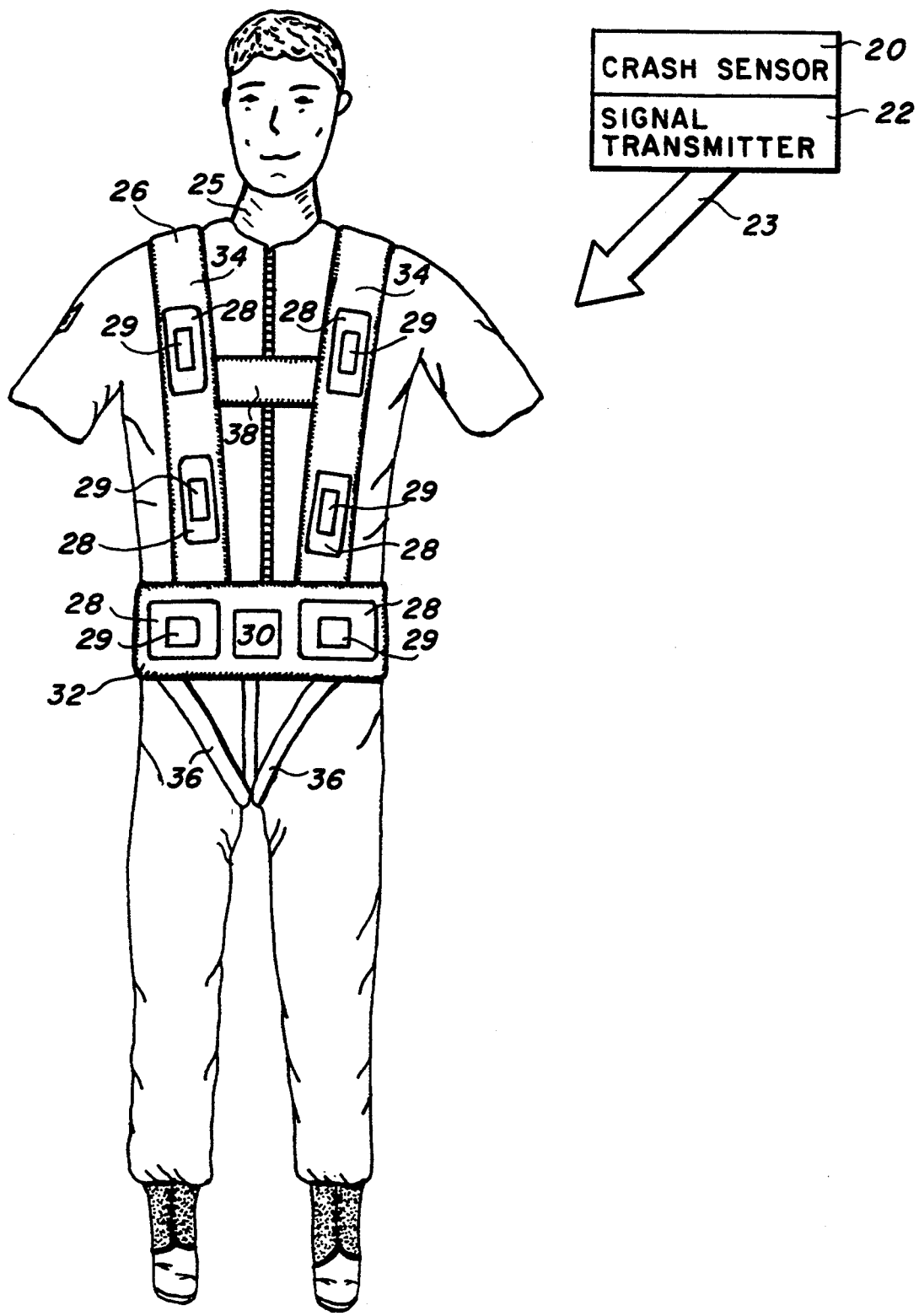
FIG. 1 shows the invention as used to protect an unrestrained person.

Referring now to the drawings, wherein like reference numerals represent similar structures throughout the several views, and more particularly to FIG. 1, a preferred embodiment of the present invention incorporates a crash sensor 20, capable of sensing imminent crashes, mounted on a helicopter (not illustrated). The crash sensor 20 should be capable of sensing accelerations in at least one axis, preferably several axes, and of discriminating between normal accelerations and those which are the precursors of a crash. Crash sensors have been utilized extensively in the automotive industry and crash sensor design is well-known in the art. Example of crash sensor technology can be found in U.S. Pat. Nos. 4,979,763, 5,109,341 and 5,073,860, to name a few.

Crash sensor 20 is mounted on the aircraft at a suitable location compatible with the type and sophistication of the crash sensor 20. Selection of the mounting structure is a relevant aspect in order to preclude both (1) damping of accelerations and (2) magnification of accelerations. Damping or magnification of accelerations might cause the crash sensor 20 to fail to detect and recognize onset accelerations as being the precursors to a crash or to improperly determine that the accelerations detected were the precursors of a crash. Determining a proper location for a crash sensor is easily determinable by a person skilled in the art.

A signal transmitter 22 is electrically interfaced to the crash sensor 20. The signal transmitter 22 sends out a wireless communication signal 23 containing sensing information from the crash sensor 20. In the event of an imminent crash, impact, or jarring motion sensed by the crash sensor 20, the signal transmitter 22 transmits a wireless communication signal 23 that could be called a "crash signal." The wireless communication signal 23 is preferably a radio signal, although it is possible that the signal could be sent via laser, infrared, or any other form of wireless communication. The wireless communication signal 23 should preferably be coded (i.e., a specific mix of frequencies, pulses, or other codifying technique is used to separate the signal from random radiation which might be imposed upon the system during operations). The amplitude of the wireless communication signal 23 should be sufficient to allow the wireless communication signal 23 to be detected inside the helicopter. Signal transmitters are well-known to persons skilled in the art of wireless communication.

The person to be protected wears, or has attached, an inflatable protection outfit which acts as a cushion to protect the person from impact injuries. An inflatable protection outfit could be an inflatable vest, jacket or some type of harness that either inflates or is equipped with inflatable bladders. FIG. 1 shows a person 25 wearing a harness 26 (hereinafter, the person 25 will be referred to as a "wearer" 25). The harness 26 should be easily donned and doffed, comfortable (i.e., not cause heat build-up or restrict body movement). The harness 26 serves as a mounting platform for a plurality of inflatable bladders 28, inflation mechanisms 29 and a signal receiver 30. The signal receiver 30 can be mounted in practically any convenient location on the harness 26. In addition, the harness 26 could also provide stowage for small amounts of survival equipment (not illustrated) and flotation bladders (not illustrated). There are many different variations of harness designs which could be used.

In the preferred embodiment, the harness 26 consists of a waist belt 32, shoulder straps 34, hold-down crotch straps 36 and anti-spreading straps 38. The waist belt 32 wraps around the waist of the wearer 25. The portion (not numbered) of the waist belt 32 which wraps around the front side of the wearer 25 could be called the "front portion" of the waist belt 32 and the portion (not illustrated) of the waist belt 32 that wraps around the back side of the wearer 25 could be called the "back portion." Shoulder straps 34 and hold-down crotch straps 36 are attached to the waist belt 32 to ensure a snug fit on the wearer 25 and to ensure proper orientation of the harness 26. The shoulder straps 34 have one end connected to the front portion and one end connected to the back portion of the waist belt 32. An anti-spreading strap 38 is used to hold the shoulder straps 34 in place and is secured to two different shoulder straps 34. There should be one anti-spreading strap 38 in the front of the harness 26 and one anti-spreading strap 38 in the back (not illustrated) of the harness 38. The hold-down crotch straps 36 connect between the front portion and the back portion of the waist belt 32.

The signal receiver 30, secured to the harness 26, is used to receive the wireless communication signal 23. The signal receiver 30 is capable of receiving wireless signals transmitted from the signal transmitter 22. The signal receiver 30 must, therefore, be compatible with the signal transmitter 22. If the signal transmitter 22 is a radio transmitter, then the signal receiver 30 should be a radio receiver. The signal receiver 30 should be able to compare constantly impinging signals against a signal code in order to discriminate between "noise" and the true signal of a developing sensed crash. Signal receivers are well-known to persons skilled in the art of wireless communication.

The signal receiver 30 could be mounted virtually anywhere on the harness 26. A likely place to mount the signal receiver 30 would be on the front of the waist belt 32 to allow for easy access and testing by the wearer 25. The signal receiver 30 should preferably be battery operated, necessitating locating the battery in a manner permitting ready removal and replacement. The signal receiver 30 should ideally include a testing capability for the wearer 25 and maintenance personnel to readily check the electronic circuitry and battery before flight. In order to optimize receipt of the communication signal 23, the signal receiver 30 may be located at other positions on the harness 26 when laser, infrared, or other communication links are used. Such placement of signal receivers to optimize signal receipt is well-known in the art of wireless communication systems.

Individual inflation mechanisms 29 are coupled by mechanical connection to each of the inflatable bladders 28. By having a separate inflation mechanism 29 coupled to each individual inflatable bladder 28, there is a redundancy which ensures that failure of one inflation mechanism will only prevent one inflatable bladder 28 from inflating. However, the same inflation mechanism could be used to inflate all the inflatable bladders 28 if the associated risk of failure was deemed acceptable. The inflation mechanisms 29 are sized to assure rapid inflation of their respective inflatable bladders 28. The inflation mechanisms 29 are interfaced to the signal receiver 30 by electrical connection. The inflation mechanisms 29 initiate inflation of the inflatable bladders 28 upon receipt by the signal receiver 30 of a crash signal transmitted from the signal transmitter 22. Therefore, in the preferred embodiment, the inflation mechanisms 29 interpret the signal from the signal receiver 30 and determine when to initiate inflation of the inflation bladders 28. Many different types of electrical circuitry or interface can be designed to initiate inflation of the inflation bladders 28 upon receipt by the signal receiver 30 of a crash signal.

The time to inflate the inflatable bladders 28 should be the shortest possible time, preferably less then 30 to 50 milliseconds. Once inflated, the inflatable bladders 28 stay inflated for a short period of time, approximately two seconds, and then rapidly deflate. The inflation/deflation process is a "one shot" procedure, i.e., the inflatable bladder can only be inflated once during each use. This type of quick inflation/deflation "one shot" procedure is commonly used in automotive airbag systems. The inflation mechanisms should preferably employ pyrotechnic devices such as cool gas generators commonly used in automotive airbag systems. Inflation mechanisms 29 are well-known in the art.

Manual initiation of the inflation mechanisms 29 is not necessary. In fact, in view of the short duration of the inflated state of the inflatable bladders 28 and their "one shot" nature, manual inflation would be undesirable. Should the wearer 25 manually initiate the inflatable bladders 28 in anticipation of an impending crash, the probability is extremely high that the inflatable bladders 28 would no longer afford any significant protection when the crash actually occurred because the inflatable bladders 28 would be deflated at the time of the impact.

Inflatable bladders 28 are located in positions to maximize protection afforded to a wearer's head, neck and torso. The positioning of the inflatable bladders 28 should be designed to assure that critical body areas do not directly impact various strike hazards. There are many different possible positions on the harness 26 where the inflatable bladders 28 can be placed. If multiple inflatable bladders 28 are used, the inflatable bladders 28 should be large enough so that, as a group, they envelop the wearer 25 or a protected body part to ensure that the wearer 25 does not directly contact any strike hazards. In the optimum situation, a bladder should be interposed between the wearer 25 and the strike hazard to absorb the energy of the impact no matter what the orientation of the wearer 25 and the potential strike hazard. The inflatable bladders 28 should be resistant to puncture.

The harness 26 and inflatable bladders 28 should not encumber the wearer 25 in the case of a post-crash escape. For this reason, the inflatable bladders 28 should tear free of the harness 26 if pulled by a moderate force such as might be encountered if the inflatable bladders 28 should snag/jam during post-crash egress. Also, as previously discussed, the inflatable bladders 28 should inflate and, almost immediately, begin a gradual deflation process. This quick inflation/deflation process provides almost immediate wearer protection against acceleration and impact injuries during the onset of a crash yet allows the wearer 25 to move safely and freely after the crash. Non-encumbrances can be especially important if a post-crash escape entailed underwater escape from a sinking craft. In a sinking craft, trapped gas could cause the inflatable bladders 28 to become snagging hazards when moving through tight spaces or else cause unwanted buoyancy, lifting the wearer 25 and preventing the wearer 25 from getting through submerged, lower elevation hatches/openings.

Figure 2A:
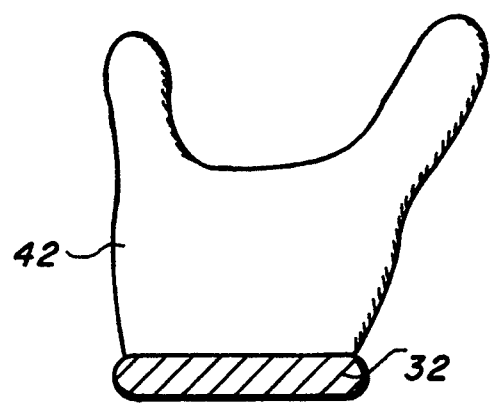
FIGS. 2a and 2b show various types of inflatable bladders.
Figure 2B:
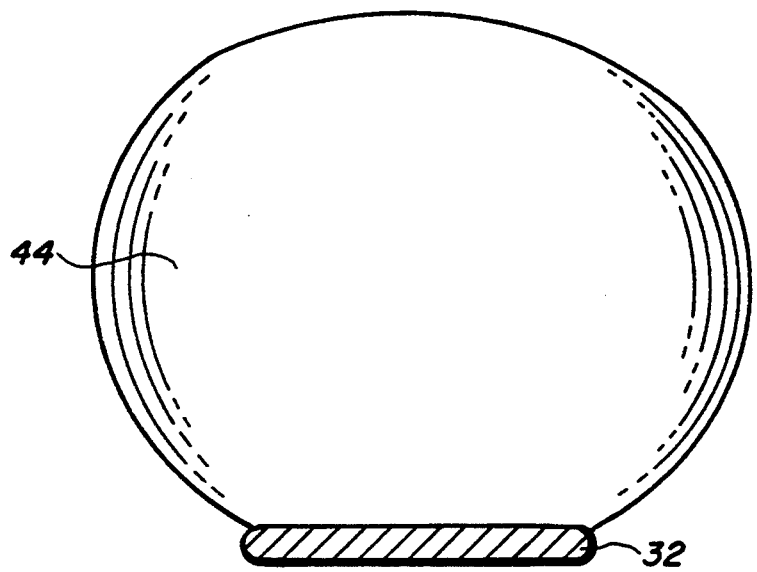

There are many different shapes and sizes for inflatable bladder design. FIG. 2a shows an upper-body-shaped (or "vest-shaped") inflatable bladder 42 which could protect the entire upper body of a wearer 25. An inflatable bladder shaped in this manner could be worn around a wearer's upper body like a vest. FIG. 2b shows a large circular shaped inflatable bladder 44 which would blow up like a circular balloon and could be used to protect the entire front portion of the wearer 25, including the wearer's chest, neck and head. Similar inflatable bladders should be used to extend downward to protect a wearer's groin and legs. The inflatable bladders 42, 44 in FIGS. 2a and 2b are shown connected to the waist belt 32.

Inflatable bladders, which can be designed in various shapes and sizes, with various strengths, and which inflate/deflate at different rates, are well-known in the art.

Figure 3:
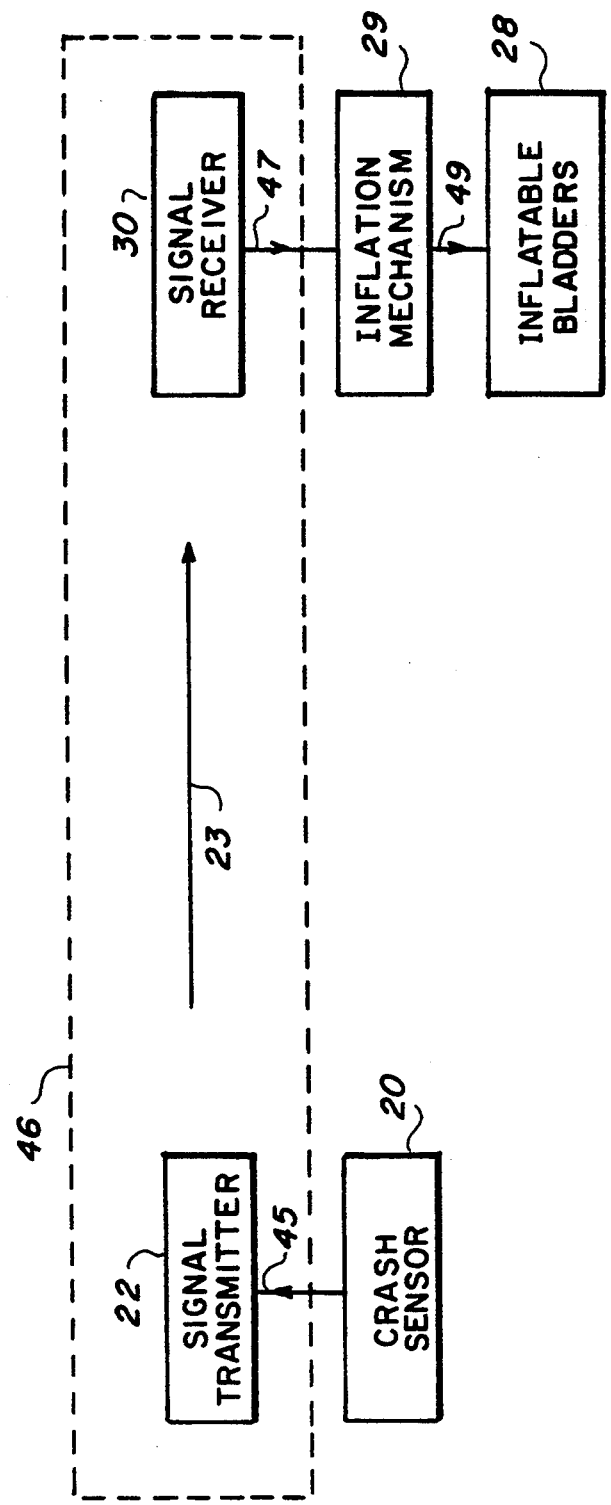
FIG. 3 shows a block diagram of the electrical signal processing parts of the invention.

FIG. 3 is a block diagram of the electrical signal processing parts of the invention. The crash sensor 20 is electrically connected 45 to the signal transmitter 22 and the signal receiver 30 is electrically connected 47 to the inflation mechanism 29. The combination of the signal transmitter 22 and the signal receiver 30 act as a wireless communication system 46 which interfaces, or links, the crash sensor 20 and the inflation mechanism 29. The signal transmitter 22 transmits a wireless communication signal 23 coded with data from the crash sensor 20. This wireless communication signal 23 is then received by the signal receiver 30, which in turn is interfaced to the inflation mechanism 29 for inflation of the inflatable bladders 28. In the preferred embodiment, the interface 49 between the inflation mechanism 29 and the inflatable bladder 28 is by mechanical connection.

The invention has a wide range of uses. It can be used to protect crew members or passengers on many different types of vehicles including land vehicles (such as buses or trucks), air vehicles (such as airplanes, helicopters, blimps or zeppelins), sea vehicles (such as boats, ships or hovercrafts) or space vehicles (such as space shuttles or spacecraft). The invention could also be modified to provide protection in a practically unlimited number of situation. For example, the invention could be outfitted to protect a litter or stretcher inside an ambulance.

It is understood that the above-described embodiment is merely illustrative of the possible specific embodiments which may represent principles of the present invention. Other arrangements may readily be devised in accordance with these principles by those skilled in the art without departing from the scope of the invention.

What is claimed as new and desired to be secured by letters patent of the United States is:

1. An inflatable protective device comprising:
   releasable inflatable means for providing protection from impacts for randomly located occupants of a vehicle;
   said occupants having unconstrained movement about the interior of said vehicle;
   said inflatable means releasing from said protective device upon the application of moderate tearing force;

inflation means, coupled to said inflatable means, for inflating said inflatable means;

crash sensing means, capable of being mounted to said vehicle, for detecting an onset of a crash;

wireless communication means for sending information from said crash sensing means to said inflation means, said wireless communication means linking said crash sensing means and said inflation means;

whereby, upon sensing the onset of a crash by said crash sensing means, a wireless communication signal is transmitted by said wireless communication means which causes said inflation means to inflate said inflatable means, said inflatable means, rapidly deflating after said crash allowing said occupants rapid egress from said vehicle thus providing protection from injury.

2. An inflatable protective device as in claim 1, wherein said wireless communication means comprises:

transmitter means, interfaced to said crash sensing means, for transmitting a wireless signal containing information from said crash sensing means; and receiving means, interfaced to said inflation means, for receiving wireless signals transmitted from said transmitter means.

3. An inflatable protective device as in claim 1, wherein said inflatable means is an inflatable body protection outfit.

4. An inflatable protective device as in claim 3, wherein said inflatable body protection outfit comprises a jacket capable of being inflated.

5. An inflatable protective device as in claim 3, wherein said inflatable body protection outfit comprises:

a harness;

at least one inflatable bladder releasably mounted on said harness; and said at least one inflatable bladder releasing from said harness upon application of moderate tearing force.

6. An inflatable protective device as in claim 5, wherein said harness comprises:

a waist belt which wraps around the waist of a wearer;

at least one shoulder strap which has one end connected to the front portion of said waist belt and one end connected to the back portion of said waist belt.

7. An inflatable protective device as in claim 6, wherein said harness further comprises at least one hold-down crotch strap which has one end connected to the front portion of said waist belt and one end connected to the back portion of said waist belt.

8. An inflatable protective device as in claim 7, wherein said harness further comprises:

at least two shoulder straps; and at least one anti-spreading strap having one end connected to one of said at least two shoulder straps and the other end connected to a second of said at least two shoulder straps.

9. An inflatable protective device as in claim 1, wherein said inflation means comprises at least one cool gas generator.

10. An inflatable protective device as in claim 2, wherein said transmitter means transmits radio signals and said receiver means receives radio signals.

11. An inflatable protective device as in claim 2, wherein said transmitter means transmits infrared signals and said receiver means receives infrared signals.

12. An inflatable protective device as in claim 2, wherein said transmitter means transmits laser signals and said receiver means receives laser signals.

13. An inflatable protective device as in claim 1, wherein said crash sensing means is mounted on an air vehicle.

14. An inflatable protective device as in claim 13, wherein said air vehicle is a helicopter.

15. An inflatable protective device as in claim 1, wherein said crash sensing means is mounted on a sea vehicle.

16. An inflatable protective device as in claim 1, wherein said crash sensing means is mounted on a space vehicle.

17. An inflatable protective device as in claim 1, wherein said crash sensing means is mounted on a land vehicle.

18. A method of protecting an occupant of a vehicle comprising:

providing a releasable inflatable means for protecting the occupant from impact while performing routine tasks requiring unconstrained movement within the interior of said vehicle;

said releasable inflatable means separating from said occupant upon moderate tearing force thereby allowing said occupants a rapid post-crash egress from the vehicle;

providing an inflation means to inflate said inflatable means;

providing crash sensing means, capable of being mounted to said vehicle, for detecting an onset of a crash producing impact;

providing a wireless communications means for sending information from said crash sensing means to said inflation means, said communications means linking said crash sensing means and said inflation means;

whereby, upon sensing the onset of a crash by said crash sensing means, a wireless communication signal is transmitted by said communication means which causes said inflation means to inflate said inflatable means thereby providing protection from injury.

19. The method of claim 18 where the releasable inflatable means includes a body protection suit.

20. The method of claim 19 where the body protection suit includes a harness.

* * * * *